No. 721,086. PATENTED FEB. 17, 1903.
A. PEDERSON.
EQUALIZING DEVICE FOR FURROW OPENING DISKS.
APPLICATION FILED SEPT. 10, 1902.
NO MODEL.

Witnesses
Inventor
Amund Pederson,
By Victor J. Evans
Attorney

UNITED STATES PATENT OFFICE.

AMUND PEDERSON, OF BARRETT, MINNESOTA.

EQUALIZING DEVICE FOR FURROW-OPENING DISKS.

SPECIFICATION forming part of Letters Patent No. 721,086, dated February 17, 1903.

Application filed September 10, 1902. Serial No. 122,848. (No model.)

*To all whom it may concern:*

Be it known that I, AMUND PEDERSON, a citizen of the United States, residing at Barrett, in the county of Grant and State of Minnesota, have invented new and useful Improvements in Equalizing Devices for Furrow-Opening Disks, of which the following is a specification.

This invention relates to rotary disks to be applied to planters for opening the furrow, but more particularly to an equalizing device adapted to be secured at a convenient point adjacent thereto and bear upon the upper portion of the periphery, so as to equalize the strain on the axle of the disk, which would otherwise be occasioned by the resistance of the earth over which the disk traversed.

In order to understand the peculiar construction of my invention, reference should be had to the following description, taken in connection with the accompanying drawings, in which—

Figure 1:
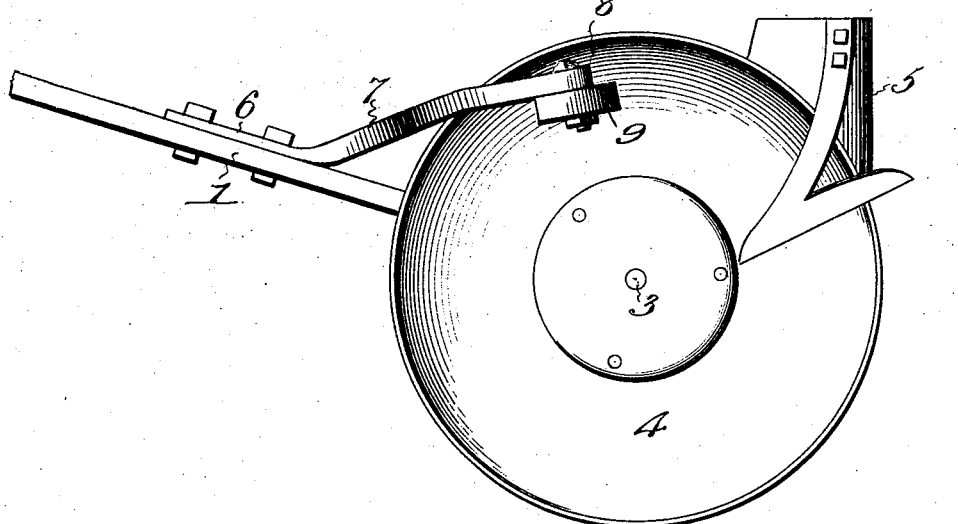
Figure 2:
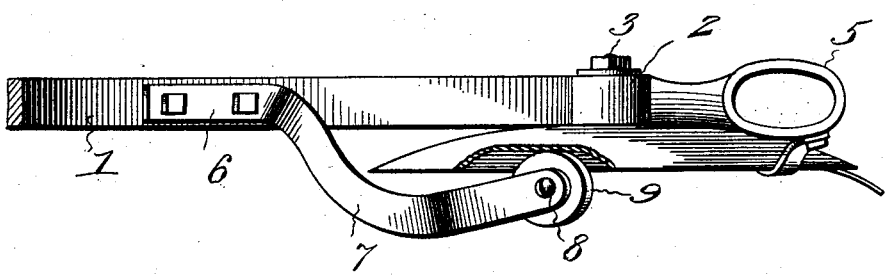
Figure 3:
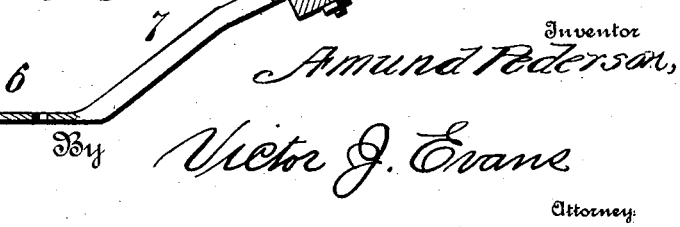

Figure 1 is a side view of a disk, its supporting-bar, and shaft, showing the equalizer applied thereto. Fig. 2 is a top plan view of the disk-supporting bar and equalizer. Fig. 3 is a longitudinal sectional view through the equalizer.

The reference-numeral 1 designates a draft-bar, of any preferred construction, which can be attached to the frame of a seed drill or planter, and on one end of the bar is a bearing 2, having a suitable opening, in which is secured an axle 3. Carried by the axle 3 is a rotary disk 4, while on the extremity of the bar 2 is a boot 5, forming part of the seed-boot which leads from a hopper, (not shown,) so as to deposit the seed adjacent the disk.

Intermediate the ends of the bar 1 and secured to the upper edge thereof is an equalizer 6. This equalizer comprises a bar adapted to be secured to the top of the bar 1 and running parallel therewith for a portion of its length, thence bent upward and inward toward the disk, as at 7, the end of the bar terminating in a slightly outwardly inclined extension 8. On the end 8 of the bar 6 is journaled a roller 9, the periphery of which is adapted and designed to bear against the concave side of the concavo-convex disk 4. The bearing-point of the roller 9 is adjacent to the upper surface of the disk, so that approximately the same lateral resistance will be offered by the roller 9 above the journal of the disk as would be offered by the earth below the journal. It will be noticed that the face of the roller 9 is at right angles to the disk 4, so that the friction on the axle and bearing will be reduced or considerably less than if no equalizing-pressure was exerted above the axle.

Having thus described the invention, what is claimed as new, and desired to be secured by Letters Patent, is—

1. An equalizing device for disks comprising a bar and having an upwardly-bent extension curved inwardly toward the disk, and a roller carried by the free end of the bar and bearing against the disk above its journal.

2. The combination with a rotary disk for an equalizing device comprising a bar, one end of which terminates adjacent the disk above the journal thereof, and a roller carried by the free end of the arm, the edge of which bears against the surface of the disk above the journal thereof.

In testimony whereof I affix my signature in presence of two witnesses.

AMUND PEDERSON.

Witnesses:
HENRY KLOSSNER,
M. B. ELLINGSON.